(12) United States Patent
Kling

(10) Patent No.: US 11,493,369 B2
(45) Date of Patent: Nov. 8, 2022

(54) DISPENSER INCLUDING SENSING DEVICE FOR REMOVABLE MOUNTING TO ADAPTER AND ASSOCIATED METHODS

(71) Applicant: Essity Hygiene and Health Aktiebolag, Gothenburg (SE)

(72) Inventor: Robert Kling, Gothenburg (SE)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 127 days.

(21) Appl. No.: 16/772,310

(22) PCT Filed: Dec. 20, 2017

(86) PCT No.: PCT/EP2017/083808
§ 371 (c)(1),
(2) Date: Jun. 12, 2020

(87) PCT Pub. No.: WO2019/120512
PCT Pub. Date: Jun. 27, 2019

(65) Prior Publication Data
US 2021/0088363 A1    Mar. 25, 2021

(51) Int. Cl.
*G01D 11/30* (2006.01)
*A47K 10/32* (2006.01)
*F16B 21/09* (2006.01)

(52) U.S. Cl.
CPC .............. *G01D 11/30* (2013.01); *A47K 10/32* (2013.01); *A47K 2010/3233* (2013.01); *F16B 21/09* (2013.01)

(58) Field of Classification Search
CPC ...................................... A47K 10/32
See application file for complete search history.

(56) References Cited

U.S. PATENT DOCUMENTS 6,164,489 A * 12/2000 Altrock ................. B23P 19/001
221/277
8,879,048 B2   11/2014 Mellot
(Continued)

FOREIGN PATENT DOCUMENTS

AT          509797 A1    11/2011
BR        PI0502133 A     5/2006
(Continued)

OTHER PUBLICATIONS

National Intellectual Property Administration (CNIPA) of the People's Republic of China, Notification of the First Office Action, Application No. 201780097847.8, dated Aug. 31, 2021 (12 pages).
Hoffmann Eitle, Response to the Communication dated Jan. 8, 2018, filed in PCT/EP2017/083808 dated Mar. 5, 2018 (7 pages).
Hoffmann Eitle, Amendment Pursuant to Article 19 PCT filed in PCT/EP2017/083808 dated Mar. 15, 2019 (18 pages).
(Continued)

*Primary Examiner* — Gene O Crawford
*Assistant Examiner* — Ayodeji T Ojofeitimi
(74) *Attorney, Agent, or Firm* — Cantor Colburn LLP

(57) ABSTRACT

A sensing device is provided for removable mounting to an adapter, the sensing device having a main body including a sensor, and at least one mounting foot for mounting the sensing device to the adapter. The mounting foot includes a supporting contact part with a supporting surface for supporting the sensing device on a sensing-device averted attachment surface of the mating adapter, and a connecting part connecting the supporting contact part to the main body.

20 Claims, 5 Drawing Sheets

(56) References Cited

U.S. PATENT DOCUMENTS

| | | | |
|---|---|---|---|
| 2009/0140113 A1 | 6/2009 | Carnevali | |
| 2013/0043265 A1 | 2/2013 | Hagleitner | |
| 2013/0256331 A1* | 10/2013 | Giraud | A61J 7/0445 221/277 |
| 2014/0190986 A1* | 7/2014 | Kikuchi | A61J 7/02 221/277 |
| 2016/0033477 A1* | 2/2016 | Son | G01N 33/4972 73/23.3 |

FOREIGN PATENT DOCUMENTS

| | | |
|---|---|---|
| CN | 1430482 A | 7/2003 |
| CN | 105705803 A | 6/2016 |
| DE | 102008041444 A1 | 2/2010 |
| DE | 102010026218 A1 | 1/2012 |
| GB | 947101 A | 1/1964 |
| JP | H0635626 A | 2/1994 |
| JP | H0635626 B2 | 5/1994 |
| WO | 2015033315 A1 | 3/2015 |

OTHER PUBLICATIONS

Hoffmann Eitle, Amendment Pursuant to Article 34 PCT filed in PCT/EP2017/083808 dated Jan. 10, 2020 (18 pages).
International Searching Authority, Search Report and Written Opinion issued in International Application No. PCT/EP2017/083808 dated Sep. 21, 2018 (14 pages).
International Searching Authority, Written Opinion of the International Preliminary Examining Authority issued in International Application No. PCT/EP2017/083808 dated Nov. 12, 2019 (7 pages).
International Searching Authority, Preliminary Reporton Patentability issued in International Application No. PCT/EP2017/083808 dated Feb. 6, 2020 (17 pages).
National Institute of Industrial Property, Examination Report, Chilean Application No. 202001681, dated Nov. 9, 2021 (17 pages).
Brazilian Patent and Trademark Office, Search Report and Written Opinion; dated Sep. 28, 2021 Application No. BR112020010812-0; Filed: Dec. 20, 2017; 4 pages.
Canadian Intellectual Property Office; Office Action; dated Feb. 4, 2022; Application No. 3,086,285; Filed: Jun. 18, 2020; 3 pages.

* cited by examiner

DISPENSER INCLUDING SENSING DEVICE FOR REMOVABLE MOUNTING TO ADAPTER AND ASSOCIATED METHODS

CROSS-REFERENCE TO RELATED APPLICATION

This application is a national phase entry of, and claims priority to, International Application No. PCT/EP2017/083808, filed Dec. 20, 2017. The above-mentioned patent application is incorporated herein by reference in its entirety.

TECHNICAL FIELD

This application relates to a sensing device for being removably mounted to an adapter, and to an adapter. The adapter is either a stand-alone component or part of a larger apparatus, for example, of a dispenser. This application further relates to a combination of sensing device and adapter, as well as to a dispenser comprising a sensing device and/or an adapter. This application also relates to a method of mounting a sensing device to an adapter, and to a method of equipping a dispenser with a sensing device and/or with an adapter.

BACKGROUND

Dispensers are used to dispense a variety of types of consumer goods to a user. An example is a dispenser for dispensing tissue products in a public bathroom. Naturally, it is very inconvenient when the dispenser is suddenly empty. Thus, it is common practice to have personnel regularly checking a dispenser in a public bathroom. The person checking the dispenser may periodically refill the apparatus whenever perceived necessary.

It is not always satisfying that the reliability of having a functional instead of an empty dispenser depends on the amount of care and attention given to this matter by the respective personnel. Moreover, it may not always be possible to provide the manpower for having people regularly check the dispensers. The latter is especially true if it takes time to check whether a dispenser is running empty soon, for example, because one needs to look inside of a dispenser.

It would be desirable, thus, to provide an improved dispenser so as to address at least one of the above-mentioned shortcomings. It would also be desired to have further equipment suited to improve existing dispensers.

SUMMARY

To address the problems with conventional dispensers and operational methods, a sensing device is provided in accordance with embodiments of the present invention. Other technical advantages are achieved by an adapter in accordance with the present disclosure, as well as by a combination of a sensing device and an adapter. Further technical advantages are also achieved by a dispenser in accordance with the present disclosure, and also by methods in accordance with the present disclosure.

In one embodiment, a sensing device is provided for being removably mounted to an adapter. The sensing device comprises a main body including a sensor, and at least one mounting foot for mounting the sensing device to the adapter. The mounting foot includes a supporting contact part with a supporting surface for supporting the sensing device on a sensing-device averted attachment surface of the adapter, and a connecting part connecting the supporting contact part and the main body. The sensing-device averted attachment surface is a surface that is "averted" from the sensing device, i.e., it faces away from the sensing device rather than towards the sensing device. The term "averted" is, hence, used in the sense of the contrary of "facing towards" or "opposing" another object.

In other words, the sensing device is configured for being mated with an adapter. Such a mating adapter may be a stand-alone component which is, e.g., itself configured to be attached to an external apparatus such as a dispenser. Alternatively, the adapter may already be removably or fixedly mounted to or even integrally formed (i.e., as one piece) with an external apparatus such as a dispenser.

The mating sensing device may be removably mounted to a dispenser and may be specifically dimensioned and shaped in order to correspond to the dispenser. Alternatively, an already existing dispenser may be equipped, as an add-on element, with an adapter, and the dispenser may be provided with the sensing device by fitting the latter to the adapter. This gives the possibility of upgrading an existing dispenser.

The sensing device for being removably mounted to an adapter offers a lot of versatility for providing an apparatus with one or several additional function(s). For example, the corresponding sensor may be used to monitor the amount of material or product to be dispensed from a dispenser. For example, this may be done using a sensor configured to measure a distance, e.g., a distance to a remaining pile or a roll of tissue products. In this case, the larger the distance, the less tissue product remains in the apparatus. By way of example, the sensing device may provide a signal if the distance exceeds a certain threshold. In one such example, the sensing device may send a signal to an external receiving device, or a part on the sensing device, the adapter or the dispenser may generate a sound or a light signal. More generally, the sensor may, e.g., provide audio, visual, and/or tactile feedback.

Further uses of the sensing device may include equipping an apparatus (such as a dispenser) with a light sensor, a temperature sensor, a humidity sensor, or with any other sensor available to the skilled person and/or with a radio module in order to provide the apparatus with an additional "add-on" function.

The mounting foot is highly convenient for mounting the sensing device to a corresponding adapter. Due to the presence of the supporting contact part, the sensing device may be stably supported. The configuration to support the sensing device on a sensing-device averted attachment surface of the mating adapter may imply that the supporting surface faces the main body of the sensing device. The facing may be in the form of the supporting surface being parallel to another surface of the main body. The two surfaces may also be parallel but not directly facing each other, for example, when the facing surface sticks out laterally with respect to the main body. The facing of the supporting surface and the main body can also be realized in a form wherein there is any angle between 0 and 90° between the two surfaces. More generally, the functional configuration of the supporting surface to support on a sensing-device averted attachment surface (rather than a sensing-device facing attachment surface) means that the supporting surface does not or at least not exclusively face away from the main body.

The supporting surface of the mounting foot thus implies that a mechanically convenient and simple way of fixing the sensing device to an adapter is offered to a user. The support on a sensing-device averted surface (rather than a facing surface) may provide additional stability, due to the possibility of sandwiching a part of the adapter with the sensing device.

The choice of connecting the supporting contact part of the mounting foot and the main body with a connecting part opens up a large design space. Specifically, the connecting part can be designed such that the mounting foot is optimized for a certain application. For example, the geometry (size, dimension, shape, curvature, angles) of the connecting part can be adapted to the geometry of a dispensing apparatus in which the sensing device is to be used.

According to some embodiments, the supporting surface faces the main body. This may offer a particularly easy and convenient arrangement allowing the sandwiching of a part of an adapter between the main body and said supporting surface. This may thus provide further stability.

The connecting part may comprise an abutting surface for limiting a movement of the supporting surface along the mating averted attachment surface (of the adapter). The abutting surface further stabilizes the sensing device when mounted to the adapter. Further, it may make it easier for a user to mount the sensing device. The user may be provided with tactile feedback on whether the sensing device has reached the final mounting positioning. Reaching the position namely may necessitate that the movement of the supporting surface along the mating averted attachment surface has reached the limit imposed by the abutting surface.

According to further embodiments, the main body comprises a mounting side facing surface. The mounting side facing surface faces an adapter upon mounting the sensing device. This provides further stability, because a part of an adapter can be sandwiched particularly easily and efficiently between the supporting surface and the mounting side facing surface. Especially, the sandwiching between supporting surface, mounting side facing surface, and abutting surface (if present) may provide a lot of stability and convenience upon mounting.

The mounting side facing surface and the supporting surface may be parallel to one another. This further promotes being able to easily and efficiently sandwich a part of the adapter with two opposite parallel surfaces in-between of the mounting side facing surface and the supporting surface of the sensing device. However, the disclosure also relates to embodiments wherein the supporting surface and the mounting side facing surface are not parallel. For example, they may be angled with respect to one another so that a wedge-shaped part of an adapter can be sandwiched in-between. Both straight and curved surface shapes of the mounting side facing surface and straight and curved shapes of the supporting surface are covered by the present disclosure.

According to another embodiment, the connecting part connects the mounting side facing surface of the main body and the supporting surface of the mounting foot. That way, a part of an adapter may be sandwiched between the connecting part, the mounting side facing surface and the supporting surface, thus further enhancing stability.

The connecting part may comprise a straight surface and/or a curved surface. At least a part of that straight or curved surface may serve as an abutting surface as described above. This is a particularly simple and effective construction.

The connecting part may comprise a first surface part and a second surface part, wherein the first surface part and the second surface part are perpendicular with respect to one another. This provides further stability when the sensing device is mounted, because contact can be made between a part of an adapter and both the first and second surfaces of the connecting part.

According to some embodiments, the first surface part and the second surface part form an L-shape. In addition thereto or alternatively, the first surface part and the supporting surface may form an L-shape, and/or the second surface part and the supporting surface may form an L-shape. Both the first and the second surface parts of the connecting part may be abutting surfaces. A combination of the three mentioned L-shapes may be desirable. Specifically, the L-shapes promote easy and efficient manufacturability of the sensing device and lead to a robust construction. Further, they allow easy fitting with corresponding right-angled corner parts of a corresponding adapter part and provide a lot of stability upon mounting the sensing device to the adapter part.

According to other embodiments, the main body comprises a resting surface for resting the sensing device on a sensing-device facing attachment surface of the mating adapter. This may further enhance stability of the attachment of sensing device to adapter. In specific embodiments, the attachment surface and the resting surface are parallel with respect to one another. However, the disclosure also encompasses embodiments wherein the attachment surface and the resting surface are not parallel.

The attachment surface and the resting surface may be configured to sandwich at least a part of the mating adapter. The mounting side facing surface may comprise or consist of the resting surface. However, the mounting side facing surface may also comprise other parts and may, e.g., be larger (or smaller) than the resting surface.

According to further embodiments, the sensing device may comprise two mounting feet. However, the disclosure also encompasses embodiments wherein the sensing device comprises more than two mounting feet or only one mounting foot. At least two mounting feet, and two mounting feet in particular, may be advantageous to provide stability to the sensing device when mounted to the adapter due to the inhibition of leverage forces.

The sensor of these and additional embodiments is configured to measure a distance between the sensor and an object or between the sensor and a user or both. The sensor may be configured to measure the distance to an object to be dispensed by the dispenser. The sensor may, in particular, be a level sensor. For example, the sensor may monitor the distance to a peripheral surface of a paper roll or to a surface of the paper stack. Specifically, the sensor may be of the type described in U.S. Pat. No. 8,879,048 B2, the specific descriptions of sensors of which are incorporated herein by reference. The sensor may fit into a dispenser for rolls and/or for bundle stacks and may be used for a dispenser that dispenses soft products.

The sensor may be suited for wireless data communication. The sensor may additionally or alternatively have an energy source. The sensor may be housed in order to withstand dust and moisture. The sensor may have a battery mounting space, a Printed Circuit Board Assembly ("PCBA"), and, optionally, a window part allowing light or a particular light range (such as IR light) to pass through. The sensor may have one part or two or more parts that may be snapped together.

In one embodiment, the sensing device comprises one or several (e.g., all) elements selected from the group consisting of: a partial transparent cover member that may comprise a daylight filter and be transparent for IR light, a printed circuit board, and a battery receiving space. At least two components of the sensing device are, in some embodiments, releasably snap-fit together. This is highly convenient for a user e.g., someone who replaces a sensor battery and/or someone who puts the sensor into the sensing device, and/or who equips an adapter with a sensing device.

In further embodiments of the invention, an adapter is provided for mating with a sensing device as described above. The adapter is configured to mate with the sensing device.

The adapter in accordance with this application comprises an insertion opening for insertion of a supporting surface of the supporting contact part of the sensing device, a slot-shaped opening for sliding therein a connecting part of the sensing device, in which the slot-shaped opening is connected to the insertion opening, and an attachment surface for being averted to a sensing device, the attachment surface extending from and/or being connected to the slot-shaped opening so as to allow the attachment surface and the supporting surface to be mated with each other.

The adapter may be a stand-alone component configured for attachment e.g., to a dispenser or some other apparatus, or it may be a part of the dispenser. It may be a part which is fixably or releasably attached to another part of an external apparatus, such as a dispenser. Alternatively, it may be integrally formed with the dispenser or other apparatus, i.e., the dispenser or other apparatus (or a part thereof) may be made as one piece together with the adapter.

The stand-alone adapter may advantageously allow making an apparatus ready to receive a sensing device. For example, it can be used to equip a dispenser in a public bathroom with a sensor for measuring how much tissue product is left in the dispenser.

Because the slot-shaped opening is connected to the insertion opening, a convenient mechanism for fitting the corresponding sensing device is provided. Specifically, the supporting surface can be inserted to the insertion opening, and the connecting part can be slid along the slot-shaped opening. For example, the slot-shaped opening may be dimensioned such that the corresponding connecting part can be press-fit therein applying only a small amount of manual force. This is an easy way to connect the adapter and the mating sensing device to one another in a stable manner.

According to some embodiments, the attachment surface extends from and/or is connected to the insertion opening. This further promotes stability of the mating of the sensing device and the adapter. The corresponding connecting part sliding in the slot-shaped opening is connected to the attachment surface, thus easy stabilizing supporting contact is established between the supporting surface and the attachment surface as the attachment surface extends from the insertion opening or is connected to the insertion opening.

The adapter may comprise a resilient element covering at least the portion of the insertion opening, the resilient element being flexible upon insertion of the supporting surface and configured to snap back so as to contact the mounting foot of the sensing device when in a position to be mounted to the adapter for providing further stability. Such a resilient element may be provided between two mounting feet. The disclosure also relates to embodiments of adapters comprising two or more resilient elements.

In other embodiments, the adapter comprises a resilient member that includes a barb, and the resilient member is configured to be flexible during mating with a sensing device and to snap back and engage the barb with an edge of the part of a sensing device when mated to the adapter. This further promotes stability and provides an easy mechanism to stabilize a sensing device on the adapter.

The adapter may comprise a mounting surface, wherein the insertion opening comprises a rectangular, opening (e.g., square) in the mounting surface, and the slot-shaped opening extends from the insertion opening in the shape of a straight or curved, or partially straight and partially curved line.

In some embodiments, the adapter comprises at least two insertion openings with at least two corresponding slot-shaped openings for fitting at least two mounting feet belonging to a single or to two or more sensing devices. This may be particularly advantageous because two mounting feet, mounted by virtue of two corresponding insertion openings and two slot-shaped openings, makes the mounting particularly easy and convenient and leads to stability after the mounting. The disclosure also encompasses embodiments in which the adapter comprises three or more insertion openings with three or more corresponding slot-shaped openings for fitting at least two or more mounting feet belonging to a single, two, three or more sensing devices.

At least one insertion opening may comprise a resilient element coupling at least the portion of the insertion opening, the resilient part being flexible upon insertion of the supporting surface of the sensing device and configured to snap back in order to contact the mounting foot of the sensing device when brought into a position for being mounted to the adapter for providing further stability, and in which another insertion opening does not comprise the resilient member. This may be advantageous as to provide a compromise between stability (due to the presence of a resilient member at least at one of the insertion openings) but also making the detachment of the sensing device particularly easy as not all of the insertion openings comprise a resilient member. In particular, the resilient member can be "left out" at a position where it is difficult for a user to place one or more fingers when trying to loosen a sensing device and take it out.

In one embodiment, the adapter comprises a surface part with the sensing device averted attachment surface on one side and the sensing device facing attachment surface on the other side. The surface part may comprise a first edge and a second edge, the flat-shaped surface may be connected to the first edge, and the insertion opening may be connected to the second edge. This construction promotes an easy, fast, and stable mating between the adapter and the sensing device.

The adapter may comprise a side surface, perpendicular to the surface part, with the insertion opening being further connected to the side surface. This construction makes inserting of the supporting surface of the mating sensing device into the insertion opening especially convenient and easy.

In further embodiments, the slot-shaped opening defines a first slot-shaped opening and the adapter comprises a second slot-shaped opening that extends in parallel to the first slot-shaped opening. The two slot-shaped openings allow a part of a mounting foot to be slid in either of them or parts to be slit in both of them, thus promoting convenience and stability. The provision of the two slot-shaped openings, especially when parallel to each other, may be combined with providing a resilient element, e.g., as described above, between the first and second slot-shaped openings and an "access" of the insertion opening. For example, the resilient member may be a tongue-shaped element surrounded by slits on three sides: the first and second slot-shaped openings as well as a slot-shaped opening and/or a differently shaped opening (e.g., an "access" to the insertion opening or the (entire) insertion opening) connecting the first and second slot-shaped openings.

The adapter may comprise a mounting surface for mounting the adapter to an external apparatus, and the mounting surface may be provided with an adhesive for attaching the adapter to the external apparatus. Thus, the adapter can be conveniently mounted to an external apparatus, such as a dispenser, using the adhesive. In some embodiments, the adhesive is covered with at least one release paper and/or tape configured to be drawn off before attaching the adapter to the external apparatus. This makes the mounting of the adapter especially easy and convenient.

In certain embodiments, the adapter comprises a curved and/or flat surface, one or several holes, projections, corners and/or combinations thereof configured to match respective counterparts in an external apparatus on which the sensor device is to be mounted. In this way, adapters can be conveniently adapted to any particular shape of dispenser or other types of apparatus.

The adapter may comprise a cover that is partially light transparent, and which may for example be infrared light transparent and not daylight transparent. The cover may hide the inside of an adapter while infrared signals (e.g., for performing sensor measurements and/or for communicating a signal to an external receiving device and/or receiving a signal from an external device) may nevertheless be transmitted. The sensing device may also comprise a cover that is partially light transparent, and which may for example be infrared light transparent and not daylight transparent. Likewise, the present disclosure encompasses dispensers and other types of apparatuses comprising a cover or at least part of a cover that is partially light transparent, such as infrared light transparent and not daylight transparent.

This application also relates to a combination of a sensing device as described above, and an adapter as described above, in which the sensing device and the adapter are configured to mate with each other. Being configured to mate means that the supporting surface of the sensing device is insertable into the insertion opening of the adapter and that the connecting part of the sensing device is slidable in the slot-shaped opening of the adapter. In other words, the sensing device and the adapter are dimensioned to fit together.

The supporting contact part of the sensing device may be dimensioned such that the supporting surface is insertable into the insertion opening of the adapter and the connecting part is slidable in the slot-shaped opening of the adapter, making contact between the supporting surface of the sensing device and the sensing-device averted attachment surface of the adapter.

The adapter may define a first adapter, and the combination may comprise a second adapter, not identical to the first adapter, in which the sensing device is reversibly connectible with the first adapter and reversibly connectible with the second adapter. An advantage of this feature is that one sensor can be fit into different adapters, thus allowing, for example, selective use in a first location or in a second location. Thus, a sensor can be used at different locations, when there is no requirement to permanently have a sensor located at all locations where a mating adapter is provided.

This application also relates to a dispenser comprising an adapter as described above. In some embodiments, the dispenser further comprises a sensing device as described above.

The dispenser may comprise a dispenser main part, with the adapter being separable from the main part. The present disclosure also relates to embodiments in which the adapter and the main part are made as one piece. The latter embodiments of the dispenser are thus already configured to be able to mate with a corresponding sensing device, i.e., without the need of "retrofitting".

The dispensing apparatus may be configured to dispense a stack of folded tissue products and/or a roll of tissue products.

This application further relates to a method of mounting the sensing device as described above to an adapter as described above. The method may include inserting the mounting foot of the sensing device into the insertion opening of the adapter, and may also include sliding the connected part of the sensing device along the slot-shaped opening of the adapter and making contact between the supporting surface of the sensing device and the attachment surface of the adapter.

The method may also include pushing the resilient member, before or during insertion of the mounting foot into the insertion opening, and, also positioning the sensing device in a mounting position such as to allow the barb to snap back and contact an edge and/or a surface of the sensing device.

This application also relates to a method of equipping a dispensing apparatus configured to dispense a stack of folded tissue products and/or a roll of tissue products with the sensing device as described above and/or with the adapter as described above.

The method may comprise pulling off the release paper and/or tape and adhering the adapter to the dispenser, for example to a wall inside of a housing of the dispenser.

The method may include removing the sensing device from the first adapter and mounting the sensing device to the second adapter.

In some embodiments, the apparatus is a dispenser, for example configured to dispense a tissue product, and the method includes positioning the adapter and/or sensing device in or on the apparatus for measuring the distance between the sensor and a user and/or the distance between the sensor and the remaining tissue product in the dispenser.

Additional advantages and features of the present disclosure, that can be realized on their own or in combination with one or several features discussed above, insofar as the features do not contradict each other, will become apparent from the following description of particular embodiments. To this end, the embodiments described may be combined in any sub-combination or combination without departing from the scope of this invention.

BRIEF DESCRIPTION OF THE DRAWINGS

The features and advantages of the invention will be appreciated upon reference to the following drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

Figure 1A:
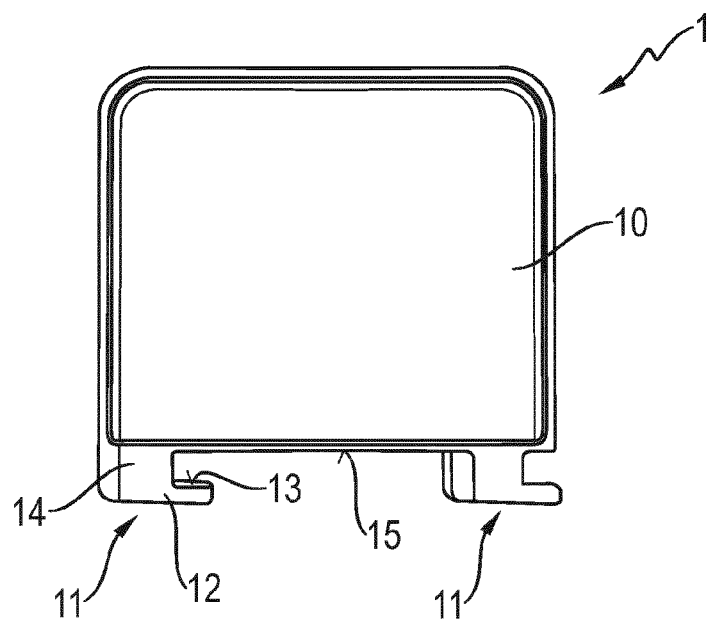
FIG. 1A is a frontal elevation view of a sensing device in accordance with one embodiment of the invention.
Figure 1B:
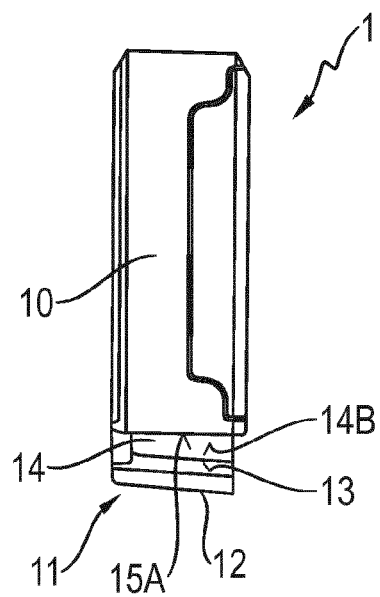
FIG. 1B is a side elevation view of the sensing device of FIG. 1A.
Figure 1C:
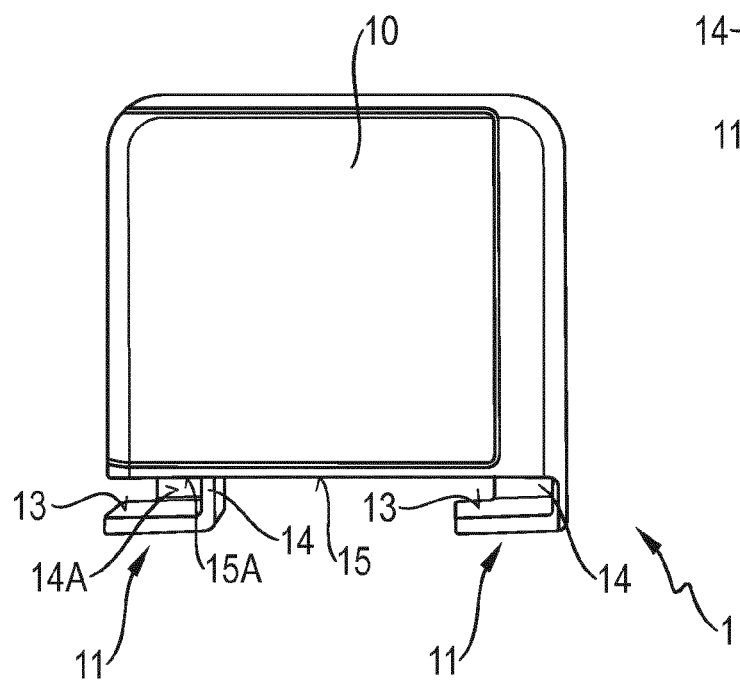
FIG. 1C is a rear elevation view of the sensing device of FIG. 1A.

Referring to the figures and particularly to FIGS. 1A, 1B, and 1C, those figures respectively show front, side, and rear portions of a sensing device 1. As used herein, the terms "front", "side", and "rear" as well as derivatives thereof refer to the orientations as shown in the figures, and therefore are not intended to carry any technically limiting meaning. A sensing device can thus also be used in orientations that differ from those in the example orientations of the figures.

The sensing device 1 is configured to be removably mounted to an adapter 2 (e.g., the adapter 2 shown in FIGS. 3A-3D). The sensing device 1 comprises a main body 10 including a sensor (not shown) and two mounting feet 11 for mounting the sensing device 1 to an adapter.

Each of the mounting feet 11 includes a supporting contact part 12 having a supporting surface 13 for supporting the sensing device 1 on a sensing-device averted attachment surface of the adapter 2 (FIGS. 3A-3D), and a connecting part 14 connecting the supporting contact part 12 to the main body 10.

Sensing device 1 in the example embodiment of FIGS. 1A-1C comprises a level sensor (not shown) that is configured to measure a distance. In embodiments in which the sensing device 1 is mounted in a dispenser of tissue products, the sensor may be, for example, configured to measure the distance to a remaining pile of stacked tissue products or to a roll of tissue products. In that regard, a large distance may be associated with a small amount of tissue product being left in the dispenser. In embodiments of that type, the sensor may be in the form of a level detection sensor. More precisely, the sensor may be a time of flight sensor configured to measure a distance by measuring traveling times of light between emission and return of a light signal upon being reflected. In this case, the time of flight sensor is, hence, used for detecting a level of tissue product remaining in a dispenser. For example, the detection may be based on laser light.

Further, in embodiments of this type, the sensor may be configured to send out a signal at regular intervals (e.g., every four seconds) to a central unit based on the measurements. Alternatively, the sensor may be configured to send signals to a central unit continuously or at other regular or irregular time intervals. The signal may be, for example, an infrared light signal. However, also other types of signals are similarly contemplated (e.g., signals with other frequencies).

The central unit is configured to receive the signals sent out by the sensor. This way, regular reporting signals on the remaining level of tissue product(s) can be received at a remote location. The central unit is located somewhere else, e.g., in an office where someone can monitor the tissue product level statuses of one or several dispensers. Further, a threshold value may be set in the central unit, with the threshold value indicating the minimum level of tissue product that is supposed to remain. As soon as a signal received by the central unit from the sensor indicates that the measured value falls below the threshold value, the central unit may inform a user (e.g., by providing a visual and/or audio signal).

Moreover, the same central unit may be configured to receive signals from several sensors mounted in several dispensers. Different thresholds may be set for different sensors. This may be advantageous as some sensors may be placed in dispensers that are, e.g., used more frequently than others so that a product should be more promptly refilled. In less frequently used dispensers, the threshold may be set differently so that the product can run lower before the central unit provides an alert message indicating that a refill would be appropriate. Different sensors may also dispense different products so that different thresholds may be sensible to be able to distinguish between how quickly different products could run out, etc. The central unit provides a convenient possibility to monitor different dispensers centrally.

In other embodiments, a sensor of the sensing device 1 itself may, however, send a signal to an external receiving device only when a threshold set in the sensor itself is exceeded or when a value drops below a threshold value. Thus, the disclosure also encompasses embodiments in which no central unit is used. Both in the case in which a central unit is used and one or several threshold(s) is/are set in the central unit, as well as when one or several thresholds are set in one or several sensors, thresholds may be manually set and/or continuously or discretely changed from a set value to a different value.

The supporting surfaces 13 of the mounting feet 11 of the sensing device 1 face the main body 10. The connecting part 14 comprises two perpendicular abutting surfaces 14A and 14B for limiting a movement of the supporting surface 13 along the mating averted attachment surface (of the not shown adapter). The abutting surfaces 14A, 14B further stabilize the sensing device 1 when mounted to the adapter. Further, they make it particularly easy and convenient for a user to mount the sensing device 1. The user is provided with tactile feedback on whether the sensing device 1 has reached the final, intended mounting positioning. Reaching the position namely goes in line with the movement of the supporting surface 13 along the mating averted attachment surface having reached the limit imposed by the presence of the abutting surfaces 14A, 14B.

The main body 10 of the sensing device 1 comprises a mounting side facing surface 15. The mounting side facing surface 15 faces an adapter upon mounting the sensing device 1. This provides further stability, because a part of an adapter can be sandwiched between the supporting surface 13 and the mounting side facing surface 15.

In the embodiment of FIGS. 1A-1C, the mounting side facing surface 15 and the supporting surface 13 are parallel to one another. This further promotes stability. However, this disclosure also relates to embodiments in which the supporting surface 13 and the mounting side facing surface 15 are not parallel to one another. For example, they may be angled with respect to one another so that a wedge-shaped part of an adapter can be sandwiched in-between. Both straight and curved surface shapes of the mounting side facing surface and/or straight and curved shapes of the supporting surface 13 may be realized for embodiments covered by the present disclosure.

The connecting part 14 connects the mounting side facing surface 15 of the main body 10 and the supporting surface 13 of the mounting foot 11. The connecting part 14 comprises a first surface part and a second surface part, with the first surface part and the second surface part being perpendicular with respect to one another. A surface of the first surface part and a surface of the second surface part form the abutting surfaces 14A and 14B, respectively.

Together, the first surface part and the second surface part form an L-shape. This can be seen in FIG. 1B, in the form of the L-shape formed by the first abutting surface 14A and the supporting surface 13, and in the form of the L-shape formed by the second abutting surface 14B and the supporting surface 13 in FIG. 1C. The L-shaped constructions particularly promote stability of the mounting of the sensing device 1 to a mating adapter (FIGS. 3A-3D).

The main body 10 comprises a resting surface 15A for resting the sensing device 1 on a sensing-device facing attachment surface of the mating adapter. The resting surface 15A is the part of the mounting side facing surface 15 of the main body 10 that faces the supporting surface 13. The resting surface 15A is in the shown embodiment at least partially (fully, in some embodiments) located opposite the supporting surface 13. Upon mounting of the sensing device 1 to an adapter, the supporting surface 13 and the resting surface 15A sandwich a part of the mating adapter.

Figure 2A:
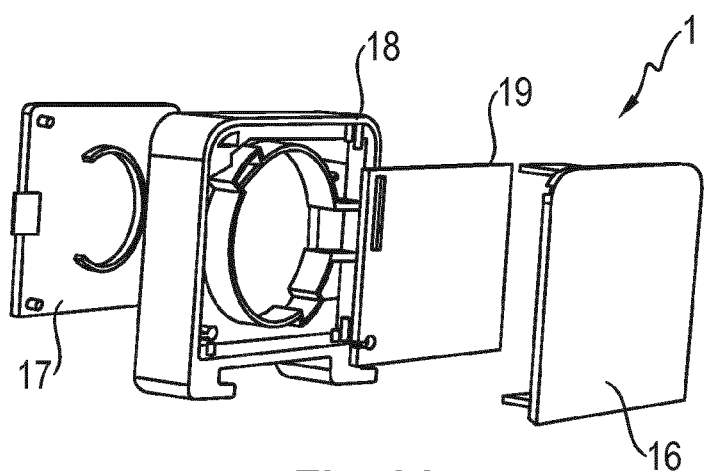
FIG. 2A is a disassembled perspective view of the sensing device of FIG. 1A.
Figure 2B:
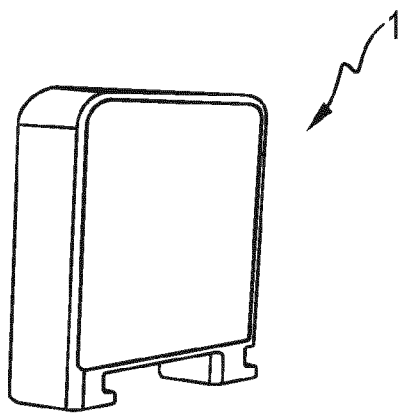
FIG. 2B is an assembled perspective view of the sensing device of FIG. 1A.

Referring now to FIGS. 2A and 2B, the sensing device 1 comprises a front cover 16 having a daylight filter that is not transparent to the human eye but that is infrared ("IR") light-transparent. The sensing device 1 also comprises a battery cover 17 on the rear side, as well as a frame 18. The front cover 16, the battery cover 17, and the frame 18 form the main body 10 of the sensing device 1.

A battery is insertable into the frame 18 via the battery cover 17. The battery is removable for replacement or for charging. In addition, the sensing device 1 comprises a PCBA part 19. An IR emitter is provided on the PCBA part 19. According to some embodiments, an IR receiver may also be provided. In the case of the present embodiment, a central unit with an IR receiver may be positioned remotely (wherever a user wants to use it). The central unit receives signals emitted by the PCBA part 19 of the sensing device 1, as described above. The PCBA part 19 may also comprise a radio transmitter and a controller for managing data from measured IR signals. The front cover 16, the frame 18, and the rear battery cover 17 can be snapped together in order to make the device dust proof and/or splash proof.

Figure 2C:
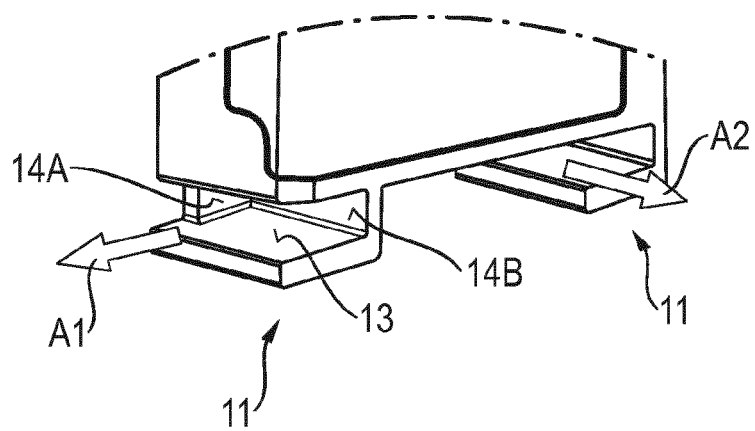
FIG. 2C is an enlarged view of a bottom portion of the sensing device of FIG. 1A, showing foot members of the sensing device.

FIG. 2C shows an enlarged view of mounting feet 11 of an embodiment of a sensing device 1 in accordance with the present disclosure. The arrows A1 and A2 illustrate two directions in which a respective mounting foot 11 can be fit to a corresponding mating adapter. Different fitting directions put into practice are shown in the figures.

As discussed above, and referring again to FIG. 1, each mounting foot 11 comprises a supporting contact part 12 with a supporting surface 13 and connecting part 14 with two abutting surfaces 14A and 14B. However, the disclosure also encompasses embodiments with one, zero, or with three or more abutting surfaces.

Figure 3A:
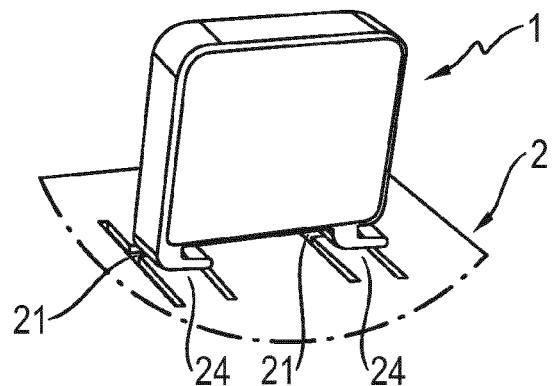
FIG. 3A is a perspective view showing a sensing device and an adapter being coupled together, in accordance with another embodiment of the invention.
Figure 3B:
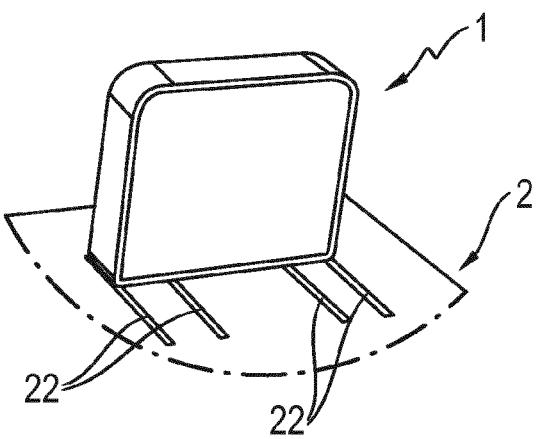
FIG. 3B is a view similar to FIG. 3A, further illustrating the sensing device and adapter being coupled together.

FIG. 3A shows a combination of an embodiment of a sensing device 1 and an example adapter 2 in accordance with the present disclosure, in a state in which the sensing device 1 is being fit to the adapter 2, i.e., a state in which the sensing device 1 and adapter 2 are being coupled to one another. FIG. 3B shows the sensing device 1 into the final mounting state in which the sensing device 1 and the adapter 2 are fully coupled/mated.

Figure 3C:
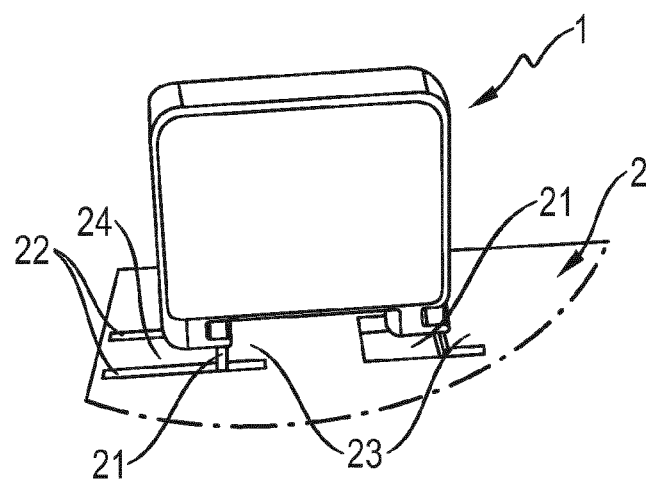
FIG. 3C is a view similar to FIG. 3B, also illustrating the sensing device and adapter being coupled together.
Figure 3D:
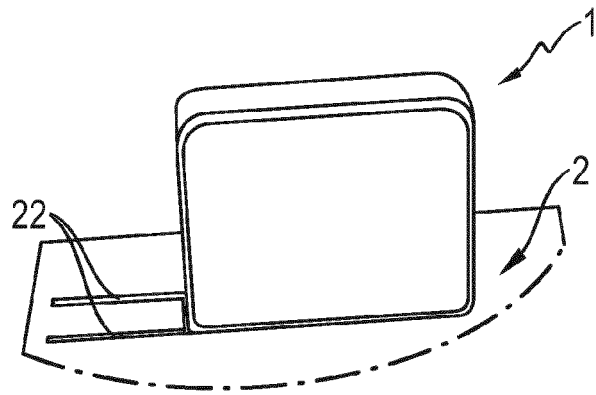
FIG. 3D is a view similar to FIG. 3C, illustrating the sensing device and adapter in a fully coupled state.

Also FIGS. 3C and 3D show a combination of an embodiment of a sensing device 1 and of an embodiment of an adapter 2 in accordance with the present disclosure, in a state in which the sensing device 1 is being fit to the adapter 2 (FIG. 3C) and the mated state (FIG. 3D), respectively.

The sensing device 1 can be fit to (at least) two different adapters 2, wherein the fitting is associated with moving in two perpendicular directions. The latter becomes apparent upon comparison of FIGS. 3A and 3B with FIGS. 3C and 3D, respectively.

The adapters 2 of FIGS. 3A and 3B and of 3C and 3D share a number of similarities. Both comprise two insertion openings 21 for inserting the supporting surfaces 13 of the supporting contact parts of the sensing device 1, slot-shaped openings 22 for sliding therein the connecting part 14 of the sensing device 1. The slot-shaped openings 22 are respectively connected to the corresponding insertion opening 21.

The adapters 2 further comprise an attachment surface 23 for being averted to a sensing device 1 (see FIG. 3C, in particular). The attachment surfaces 23 extend from and are connected to the respective slot-shaped openings 22 to allow the attachment surfaces 23 and the respective supporting surfaces 13 of the sensing device 1 to be mated with each other.

The attachment surfaces 23 extend from and are connected to the respective insertion openings 21. This further promotes stability of the mating of the sensing device 1 and the adapter 2. The corresponding connecting part 14 sliding in the slot-shaped opening 22 is connected to the attachment surface 23. Thus, easy stabilizing supporting contact is established between the supporting surface 13 and the attachment surface 23 as the attachment surface 23 extends from the insertion opening 21 or is connected to the insertion opening 21.

The adapter 2 of FIGS. 3A and 3B as well as the adapter 2 of FIGS. 3C and 3D both comprise a resilient element 24. In particular, the resilient member 24 shown on the left-hand side of FIG. 3C covers a portion of the insertion opening 21, with the resilient element 24 being flexible upon insertion of the supporting surface 13 and configured to snap back for contacting the mounting foot 11 of the sensing device 1 when in a position to be mounted to the adapter 2. This provides further stability.

Figure 4A:
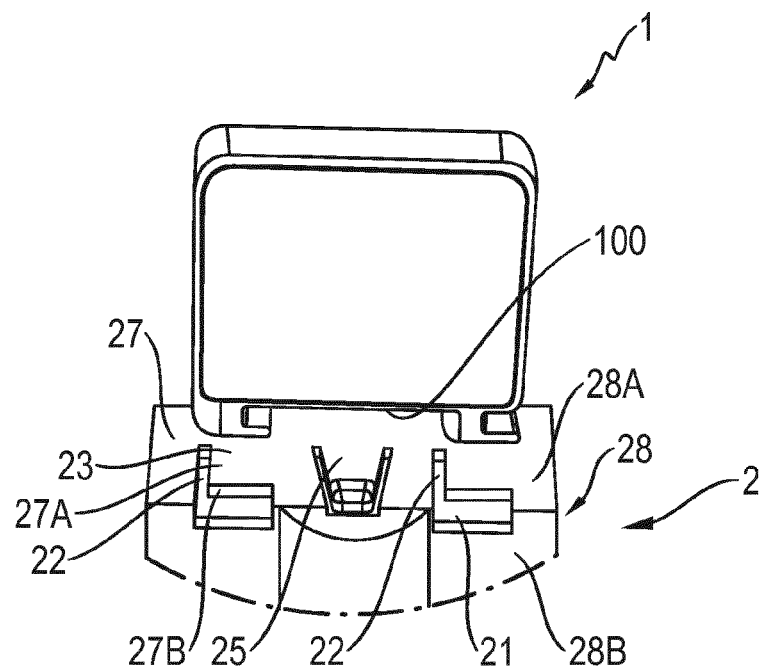
FIG. 4A is a view similar to FIG. 3A, showing the sensing device and adapter in a state prior to the sensing device and adapter being coupled to one another.
Figure 4B:
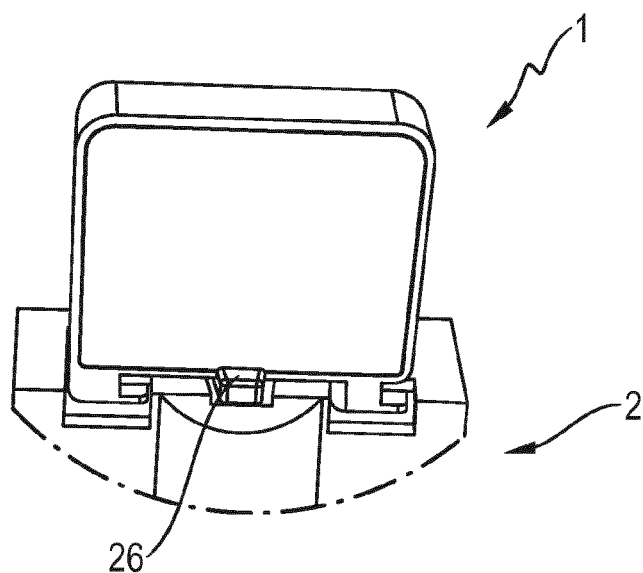
FIG. 4B is a view similar to FIG. 4A, showing the sensing device and adapter in a state in which they are fully coupled to one another.

FIG. 4A shows a sensing device 1 and an adapter 2 in accordance with the present disclosure in a state before the sensing device 1 is fit to the adapter 2. FIG. 4B shows the sensing device 1 fitted and connected (i.e., fully coupled) to the adapter 2.

The adapter 2 of FIGS. 4A and 4B comprises a resilient member 25 that includes a barb 26. The resilient member 25 is configured to be flexible during mating with the sensing device 1. It snaps back and engages the barb 26 with an edge 100 of a part of a sensing device 1 (see FIG. 4A) when mated to the adapter 2. This further promotes stability and provides an easy mechanism for stabilizing a sensing device 1 on the adapter 2.

Also the embodiment of FIGS. 4A and 4B of an adapter 2 comprises insertion openings 21 and slot-shaped openings 22.

The adapter 2 comprises a mounting surface 27. The insertion openings 21 comprise square shaped openings in the mounting surface 27, and the slot-shaped openings 22 extend from the insertion openings 21 in the shape of straight lines. The mounting surface 27 in the shown embodiment comprises a first edge 27A and a second edge 27B. The slot-shaped openings 22 may be connected to the first edge 27A, and the insertion opening may be connected to the second edge 27B. This construction promotes an easy, fast, and stable mating between the adapter 2 and the sensing device 1. Further, the mounting surface 27 comprises the sensing device facing attachment surface 23. The sensing device averted attachment surface (not shown in FIG. 4) is provided on the opposite side of the sensing device facing attachment surface 23.

A surface part 28 of the adapter 2 comprising a surface 28A which faces a mating sensing device, and a side surface 28B, perpendicular to the surface 28A. The insertion opening 21 is further connected to the side surface 28B.

Figure 5A:
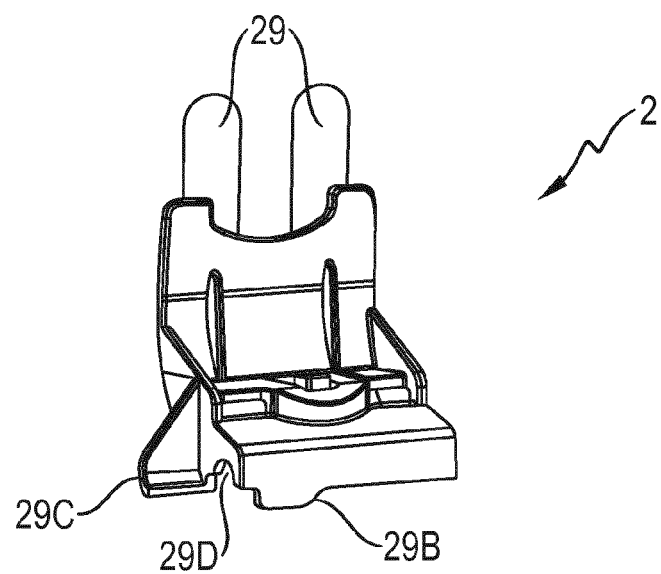
FIG. 5A is a perspective view of an adapter in accordance with a further embodiment of the invention.
Figure 5B:
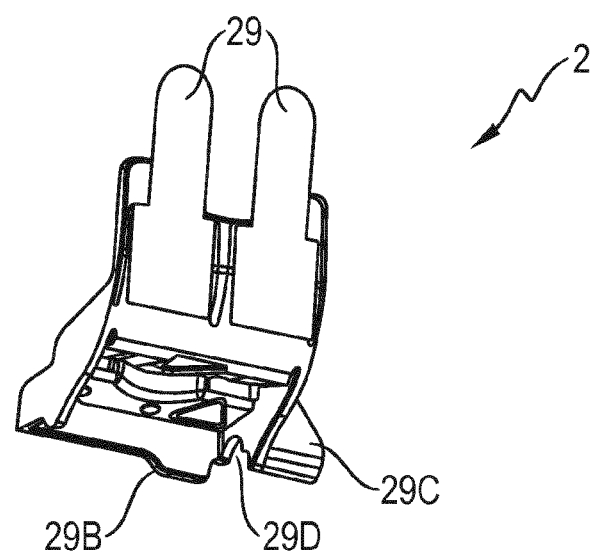
FIG. 5B is a view similar to FIG. 5A, showing a rear side of the adapter.
Figure 5C:
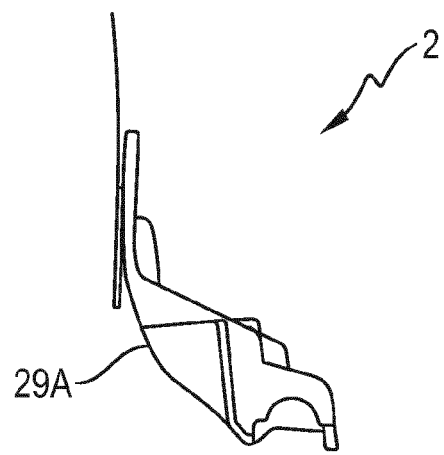
FIG. 5C is a side elevation view of the adapter of FIG. 5A.

With reference to FIGS. 5A, 5B, and 5C, the adapter 2 in the illustrated embodiment is a stand-alone component that can be used to provide an already existing apparatus such as a dispenser(not shown) with the possibility of fitting a sensing device including a sensor of choice. For example, it can be used to make a dispenser in a public bathroom including a pile of tissue products or a roll of tissue product ready to be equipped with a level sensor for measuring how much tissue material and/or product is left in the dispenser at any given time.

The adapter 2 of FIGS. 5A-5C comprises two mounting surfaces for mounting the adapter 2 to an external apparatus. The mounting surfaces are provided with an adhesive for conveniently attaching the adapter 2 to the external apparatus (not shown). The adhesive is covered with release paper 29 configured to be removed before attaching the adapter 2 to the external apparatus. This makes the mounting of the adapter 2 especially easy and convenient while avoiding a user inadvertently getting the adapter 2 stuck to something else before actually fixing it to the apparatus.

The adapter 2 is suitably designed so as to adapt to a specific dispenser. These specific adaptations correspond to mating surfaces of the dispenser and comprise a curved surface 29A that cooperates so as to fit into a corresponding curved inside surface inside of a housing of a mating dispenser (see FIG. 5C, in particular). This embodiment of an adapter 2 in accordance with the present disclosure also comprises protrusions 29B and 29C (see FIGS. 5A and 5B) and a recess 29D shaped so as to mate with corresponding recesses and a protrusion in the dispenser, respectively, to which the adapter 2 is to be mounted. Generally, an adapter in accordance with the present disclosure may comprise any mating surfaces (curved and/or flat etc.), holes, projections/protrusions, corners, and/or any combinations thereof, matched to correspond to surfaces, projections/protrusions, corners, and/or combinations thereof of the dispenser with which the respective adapter is to be used. In this way, an adapter may be individualized to correspond to a particular dispenser and to be mountable in a particularly convenient and stable manner. Additional stability may, hence, be provided by corresponding surfaces of the adapter and the dispenser and also by protrusions of the adapter fit into recesses/holes of the dispenser and/or protrusions of the dispenser fit into recesses/holes of the adapter.

It will be apparent to those skilled in the art that various modifications and variations can be made in the disclosed devices and systems without departing from the scope of the disclosure. Other aspects and embodiments of the invention will be apparent to those skilled in the art from consideration of the specification and practice of the features disclosed herein. It is intended that the specification and examples be considered as exemplary only. Many additional variations and modifications are possible and are understood to fall within the framework of the disclosure.

What is claimed is:

1. A dispenser comprising:
   at least one adapter, and
   at least one sensing device for being removably mounted to the adapter,
   the sensing device comprising a main body including a sensor, and at least one mounting foot for mounting the sensing device to the adapter,
   the mounting foot including:
      a supporting contact part with a supporting surface for supporting the sensing device on a sensing-device averted attachment surface of the adapter, and
      a connecting part connecting the supporting contact part and the main body, the adapter comprising:
      an insertion opening for insertion of the supporting surface of the sensing device;
      a slot-shaped opening for sliding therein the connecting part of the sensing device, the slot-shaped opening being connected to the insertion opening; and
      the attachment surface for being averted to the sensing device, the attachment surface extending from and/or connected to the slot-shaped opening so as to allow the attachment surface and the supporting surface to be mated with each other.

2. The dispenser of claim 1, wherein the supporting surface faces the main body.

3. The dispenser of claim 1, wherein the connecting part comprises an abutting surface for limiting movement of the supporting surface along the attachment surface.

4. The dispenser of claim 1, wherein the main body comprises a mounting side facing surface, wherein the supporting surface is preferably parallel to the mounting side facing surface, wherein the connecting part connects the mounting side facing surface to the supporting surface.

5. The dispenser of claim 1, wherein the connecting part comprises a first surface part and a second surface part, the first surface part and the second surface part being perpendicular with respect to one another, wherein at least one pair selected from the group including: the first surface part, the second surface part, and the supporting surface thereby form an L-shape configuration.

6. The dispenser of claim 4, wherein the main body comprises a resting surface for resting the sensing device on a sensing-device facing attachment surface of the adapter, the sensing-device facing attachment surface and the resting surface preferably being parallel with respect to one another, wherein the sensing-device facing attachment surface and the resting surface are configured to sandwich at least a part of the adapter, and wherein the mounting side facing surface comprises the resting surface.

7. The dispenser of claim 1, the sensor being configured to measure a distance between the sensor and at least one of an object and a user.

8. The dispenser of claim 1, wherein the sensor is a time of flight sensor.

9. The dispenser of claim 1, wherein the sensing device comprises one or several elements selected from the group consisting of:

a partially transparent cover member, comprising a daylight filter and transparent for IR light;
a printed circuit board;
a battery receiving space;
wherein at least two components of the sensing device are snap fit together in a releasable manner.

10. The dispenser of claim 1, wherein the attachment surface also extends from and is connected to the insertion opening.

11. The dispenser of claim 1, further comprising a resilient element covering at least a portion of the insertion opening, the resilient element being flexible upon insertion of the supporting surface and configured to snap back so as to contact the mounting foot of the sensing device when in a position to be mounted to the adapter for providing further stability.

12. The dispenser of claim 1, comprising a resilient member with a barb, the resilient member configured to be flexible during mating with a sensing device and to snap back and engage the barb with an edge of a part of a sensing device when mated with the adapter.

13. The dispenser of claim 1, comprising a mounting surface, wherein the insertion opening comprises a rectangular opening in the mounting surface, and the slot-shaped opening extends from the insertion opening in the shape of a line that is straight, curved, or partially straight and partially curved.

14. The dispenser of claim 1, comprising at least two insertion openings with at least two corresponding slot-shaped openings for fitting at least two mounting feet belonging to a single or to two or more sensing devices, wherein at least one insertion opening comprises a resilient element covering at least a portion of the insertion opening, the resilient element being flexible upon insertion of the supporting surface of the sensing device and configured to snap back so as to contact the mounting foot of the sensing device when brought into a position for being mounted to the adapter for providing further stability, and wherein another insertion opening does not comprise a resilient member.

15. The dispenser of claim 1, comprising a surface part with the sensing device averted attachment surface on one side and a sensing device facing attachment surface on the other side, the surface part comprising a first edge and a second edge, the slot-shaped opening being connected to the first edge and the insertion opening being connected to the second edge,
wherein the dispenser further comprises a side surface, perpendicular to the surface part, wherein the insertion opening is further connected to the side surface.

16. The dispenser of claim 1, the slot-shaped opening constituting a first slot-shaped opening, the adapter comprising a second slot-shaped opening extending parallel to the first slot-shaped opening.

17. The dispenser of claim 1, wherein the dispenser further comprises at least one of:
a mounting surface for mounting the adapter to an external apparatus, the mounting surface being provided with adhesive for attaching the adapter to the external apparatus, wherein the adhesive is covered with at least one of release paper and tape configured to be drawn off before attaching the adapter to the external apparatus, and
a curved and/or flat surface, one or several holes, projections, corners and/or combinations thereof configured to match respective counterparts on an external apparatus on which the sensor device is to be mounted.

18. The dispenser of claim 1, comprising a cover which is at least in part partially light transparent, specifically infrared light transparent and not daylight transparent.

19. The dispenser of claim 1, comprising a dispenser main part, wherein the adapter is separable from the main part or is formed integrally as one piece with the main part.

20. A method of mounting a sensing device of a dispenser to an adapter of the dispenser, the method comprising:
providing the dispenser to as to comprise:
the adapter, and
the sensing device for being removably mounted to the adapter,
the sensing device comprising a main body including a sensor, and at least one mounting foot for mounting the sensing device to the adapter,
the mounting foot including: a supporting contact part with a supporting surface for supporting the sensing device on a sensing-device averted attachment surface of the adapter, and a connecting part connecting the supporting contact part and the main body,
the adapter comprising: an insertion opening for insertion of the supporting surface of the sensing device; a slot-shaped opening for sliding therein the connecting part of the sensing device, the slot-shaped opening being connected to the insertion opening; and the attachment surface for being averted to the sensing device, the attachment surface extending from and/or connected to the slot-shaped opening so as to allow the attachment surface and the supporting surface to be mated with each other,
wherein the method further comprises:
inserting the mounting foot of the sensing device into the insertion opening of the adapter, and
sliding the connecting part of the sensing device along the slot-shaped opening of the adapter and making contact between the supporting surface of the sensing device and the attachment surface of the adapter.

* * * * *